United States Patent
Fukuoka et al.

(10) Patent No.: US 8,064,393 B2
(45) Date of Patent: Nov. 22, 2011

(54) WIRELESS COMMUNICATION BASE STATION APPARATUS AND WIRELESS COMMUNICATION METHOD IN MULTICARRIER COMMUNICATION

(75) Inventors: Masaru Fukuoka, Ishikawa (JP); Akihiko Nishio, Kanagawa (JP); Kenichi Miyoshi, Kanagawa (JP); Daichi Imamura, Kanagawa (JP); Kenichi Kuri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 818 days.

(21) Appl. No.: 11/997,841

(22) PCT Filed: Aug. 4, 2006

(86) PCT No.: PCT/JP2006/315520
§ 371 (c)(1),
(2), (4) Date: Feb. 4, 2008

(87) PCT Pub. No.: WO2007/018154
PCT Pub. Date: Feb. 15, 2007

(65) Prior Publication Data
US 2010/0165926 A1  Jul. 1, 2010

(30) Foreign Application Priority Data
Aug. 5, 2005  (JP) ................................. 2005-228456

(51) Int. Cl.
*H04W 4/00* (2009.01)
*H04J 1/00* (2006.01)
(52) U.S. Cl. ....................................... 370/329; 370/343
(58) Field of Classification Search .................... 370/329
See application file for complete search history.

(56) References Cited

U.S. PATENT DOCUMENTS

| | | | |
|---|---|---|---|
| 4,747,101 A * | 5/1988 | Akaiwa et al. | 370/329 |
| 2002/0085641 A1* | 7/2002 | Baum | 375/260 |
| 2005/0047259 A1 | 3/2005 | Ahn | |
| 2006/0203707 A1* | 9/2006 | Lee et al. | 370/208 |
| 2006/0215603 A1 | 9/2006 | Nishio | |
| 2006/0221807 A1 | 10/2006 | Fukuoka | |
| 2007/0155323 A1 | 7/2007 | Matsumoto | |
| 2008/0095039 A1 | 4/2008 | Joo | |

FOREIGN PATENT DOCUMENTS

| | | |
|---|---|---|
| CN | 1489844 | 4/2004 |
| JP | 11-266224 | 9/1998 |

(Continued)

OTHER PUBLICATIONS

International Search Report dated Oct. 24, 2006.

(Continued)

*Primary Examiner* — Jeffrey Pwu
*Assistant Examiner* — Jasmine Myers
(74) *Attorney, Agent, or Firm* — Dickinson Wright PLLC

(57) ABSTRACT

Provided is a wireless communication apparatus by which reduction of a diversity gain can be suppressed at minimum in the case of employing a repetition technology in multicarrier communication. In the wireless communication apparatus (100), repetition sections (102-1 to 102-n) repeat each data symbol inputted from modulating sections (101-1 to 101-n) to create a plurality of identical data symbols. An allocating section (103) outputs each data symbol to a multiplexing section (105) by allocating the data symbol to a plurality of subcarriers constituting an OFDM symbol. At this time, the allocating section (103) allocates at least one of the repeated identical symbols to a subcarrier different from a subcarrier to which the symbol is allocated in an adjacent sector.

7 Claims, 14 Drawing Sheets

FOREIGN PATENT DOCUMENTS

| | | |
|---|---|---|
| JP | 2004-312291 | 11/2004 |
| WO | 03/043245 | 5/2003 |
| WO | 2005/006622 | 1/2005 |
| WO | 2005-018186 | 2/2005 |
| WO | WO 2005018186 A1 * | 2/2005 |
| WO | 2005-074178 | 8/2005 |

OTHER PUBLICATIONS

N. Maeda, et al., "Kudari Link Broadband Channel ni Okeru OFCDM no Tokusei Hikaku," IEICE Technical Report, RCS2002-162, vol. 102, No. 282, Aug. 2002, pp. 95-100.

Chinese Office Action dated Jun. 8, 2010.

N. Maeda, et al., "Performance Comparisons between OFCDM and OFDM in a Forward Link Broadband Channel," Technical Report of IEICE RCS2002-162, Aug. 2002, pp. 95-100.

"Downlink Channelization and Multiplexing for EUTRA," 3GPP TSG RAN WG1 Ad Hoc on LTE, R1-050604, Jun. 2005, pp. 1-9.

Japanese Office Action dated Aug. 2, 2011.

* cited by examiner

| PRIORITY | MAPPING PATTERN |
|---|---|
| 1 | MAPPING PATTERN 1 |
| 2 | MAPPING PATTERN 3 |
| 3 | MAPPING PATTERN 2 |
| 4 | MAPPING PATTERN 4 |

FIG.12

WIRELESS COMMUNICATION BASE STATION APPARATUS AND WIRELESS COMMUNICATION METHOD IN MULTICARRIER COMMUNICATION

TECHNICAL FIELD

The present invention relates to a radio communication base station apparatus and a radio communication method in multicarrier communications.

BACKGROUND ART

In the field of wireless communication, especially in mobile communication, a variety of information such as image and data in addition to voice becomes transmission targets in recent years. It is anticipated that the demand for high-speed transmission becomes further increased in the future, and to perform high-speed transmission, a wireless transmission scheme, which utilizes limited frequency resources more effectively to achieve high transmission efficiency, has been required.

OFDM (Orthogonal Frequency Division Multiplexing) is one of radio transmission techniques, for meeting these demands. OFDM is one of multicarrier communication techniques, whereby data are transmitted in parallel using a large number of subcarriers, and it is known that OFDM provides high frequency efficiency and reducing inter-symbol interference under a multipath environment and is effective to improve transmission efficiency.

Studies are being conducted for performing frequency scheduling transmission and frequency diversity transmission using this OFDM on the downlink, when data for a plurality of radio communication mobile station apparatuses (hereinafter simply "mobile stations") are frequency multiplexed on a plurality of subcarriers (see Non-Patent Document 1 for example).

In frequency scheduling transmission, a radio communication base station apparatus (hereinafter simply "base station") adaptively allocates subcarriers for mobile stations, based on received quality of each frequency band in each mobile station, so that it is possible to obtain a maximum multi-user diversity effect, thereby enabling extremely efficient communication. This frequency scheduling transmission scheme is mainly suitable for data transmissions when a mobile station moves at low speed. On the other hand, since frequency scheduling transmission requires feedback of received quality information from each mobile station, frequency scheduling transmission is not suitable for data transmissions when a mobile station moves at high speed. Moreover, frequency scheduling transmission is performed based on received quality from each mobile station, and so it is difficult to apply frequency scheduling transmission to a common channel. Also, frequency scheduling is usually performed per subband, which groups a certain number of neighboring subcarriers adjacent to coherent bandwidth into a block, and so not much frequency diversity effect is provided.

On the other hand, frequency diversity transmission maps data for the mobile stations in the subcarriers of the entire band in a distributed manner so that a high frequency diversity effect can be obtained. Moreover, frequency diversity transmission does not require feedback of received quality information from mobile stations, so that frequency diversity transmission is a useful scheme where frequency scheduling transmission is difficult to apply, as described above. On the other hand, the frequency diversity transmission is performed regardless of received quality for each mobile station, and so multi-user diversity effect such as the frequency scheduling transmission cannot be obtained.

Moreover, in OFDM, the quality of each subcarrier may greatly fluctuate depending on frequency selective fading due to multi-path. In this case, since the signal allocated to a subcarrier at a position of a fading valley has a poor quality, thus making demodulation thereof difficult, the quality of the signal needs to be improved so as to make demodulation possible.

A technique for improving the quality in OFDM is the so-called repetition. The repetition is a technique in which a certain symbol is repeated to generate a plurality of same symbols, and these same symbols are allocated to a plurality of different subcarriers or different times to be transmitted. These same symbols are subjected to maximum ratio combining at the receiver side, whereby a diversity gain can be obtained (refer to Non-Patent Document 2, for example).

Non-Patent Document 1: R1-050604 "Downlink Channelization and Multiplexing for EUTRA" 3GPP TSG RAN WG1 Ad Hoc on LTE, Sophia Antipolis, France, 20-21 Jun., 2005

Non-Patent Document 2: Maeda, Atarashi, Kishiyama, Sawahashi "Performance Comparison between OFC DM and OFDM in a Forward Link Broadband Channel", Technical Report of IEICE, RCS2002-162, August 2002

DISCLOSURE OF INVENTION

Problems to be Solved by the Invention

Here, assume that combination of frequency frequency diversity transmission and repetition technique further improve received quality in mobile stations.

However, for example, in a mobile communication system where a plurality of sectors are provided in one cell, if all of a plurality of the same symbols generated by repetition are mapped to the same subcarriers as subcarriers where symbols are mapped in neighboring sectors, all of these plurality of the same symbols are subjected to interference from the neighboring sectors, and so, diversity gain by repetition significantly reduces. The same problem applies between neighboring cells.

It is therefore an object of the present invention to provide abase station and radio communication method that make it possible to minimize the decrease of diversity gain when repetition technique is used in multicarrier communications.

Means for Solving the Problem

In accordance with one aspect of the present invention, a mobile station employs a configuration having a radio communication base station apparatus transmitting a multicarrier signal formed with a plurality of subcarriers, the apparatus comprising: a repetition section that repeats a symbol to generate a plurality of same symbols; and a mapping section that maps the plurality of the same symbols to the plurality of subcarriers, wherein the mapping section maps at least one of the plurality of the same symbols to a subcarrier that is different from a subcarrier where a symbol is mapped in a neighboring sector or neighboring cell.

Advantageous Effect of the Invention

The present invention makes it possible to minimize the decrease of diversity gain.

BRIEF DESCRIPTION OF DRAWINGS

FIG. 12 is a table of priority according to Embodiment 3 of the present invention;

BEST MODE FOR CARRYING OUT THE INVENTION

Now, embodiments of the present invention will be described below in detail with reference to the accompanying drawings.

Embodiment 1

According to the present embodiment, the base station maps at least one of a plurality of the same symbols generated by repetition, to different subcarriers from subcarriers where symbols are mapped in neighboring sectors.

Figure 1:
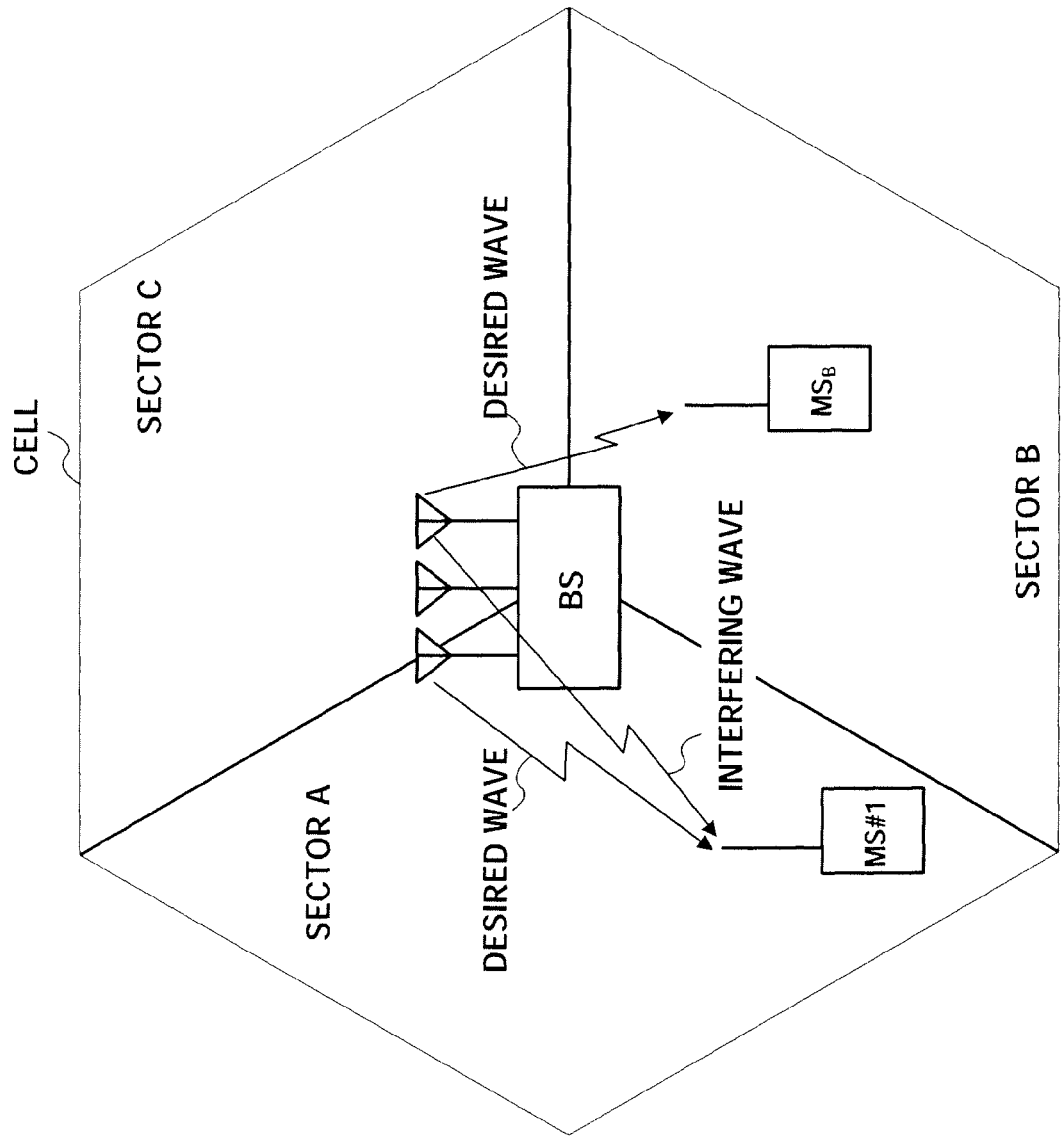
FIG. 1 is a configuration diagram showing a mobile communication system, according to Embodiment 1 of the present invention.

First, FIG. 1 shows the configuration of the mobile communication system according to the present embodiment. Here, a case will be described herewith an example where one cell is divided into three sectors A to C. Moreover, a case will be described here where in sector A transmission is performed by combining frequency scheduling transmission and repetition technique and where in sector B frequency diversity transmission is performed.

Base station BS is provided with three antennas for each sector and transmits signals from the antennas to mobile station MS's located in each sector.

Base station BS transmits multicarrier signal A in which a plurality of the same symbols generated by repetition are mapped to a plurality of subcarriers, to mobile station MS#1 located in sector A by frequency scheduling transmission. Moreover, at the same time, base station BS transmits multicarrier signal B to mobile station $MS_B$ located in sector B by frequency diversity transmission. When sector A and sector B are neighboring and mobile station MS#1 is located near the boundary between sector A and sector B, mobile station MS#1 receives multicarrier signal A as a desired wave. However, at the same time, mobile station MS#1 has to receive multicarrier signal B, which is the desired wave for mobile station $MS_B$, as an interfering wave.

Here, as described above, if all of a plurality of the same symbols in multicarrier signal A generated by repetition are mapped to the same subcarriers as the subcarriers where symbols are mapped in multicarrier signal B, all of these plurality of the same symbols are subjected to interference from neighboring sector B, and so diversity gain by repetition significantly decreases in sector A.

Then, base station BS maps at least one of a plurality of the same symbols generated by repetition in multicarrier signal A, to subcarriers that are different from subcarriers in multicarrier signal B where symbols are mapped in neighboring sector B.

Figure 2:
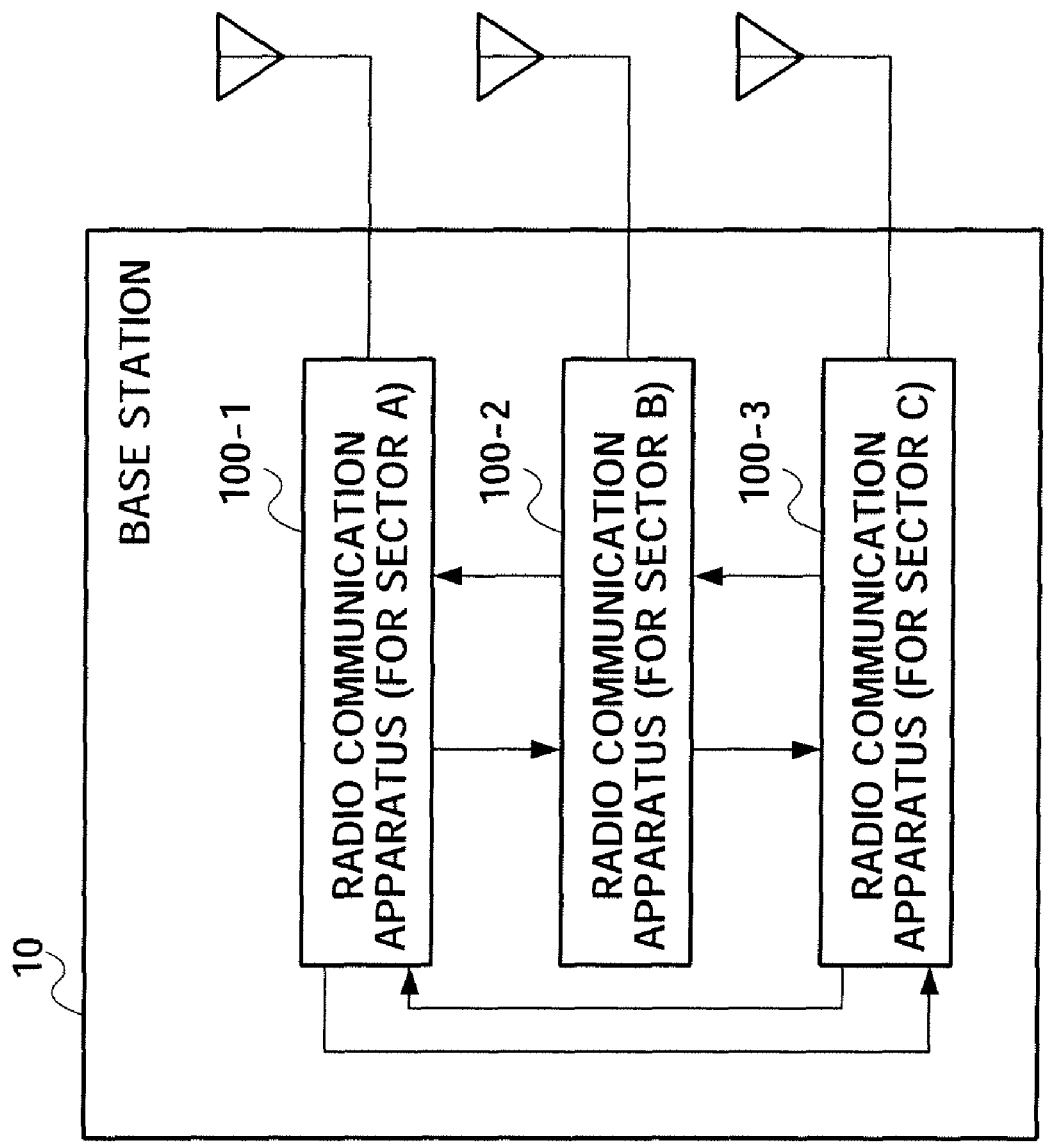
FIG. 2 is a block diagram showing a configuration of a base station, according to Embodiment 1 of the present invention.

Next, FIG. 2 shows the configuration of base station 10 according to the present embodiment. Base station 10 includes radio communication apparatuses 100-1 to 100-3 for sectors A to C, respectively. Moreover, mapping information showing mapping conditions as to which symbols are mapped to which subcarriers, is exchanged between these radio communication apparatuses.

Figure 3:
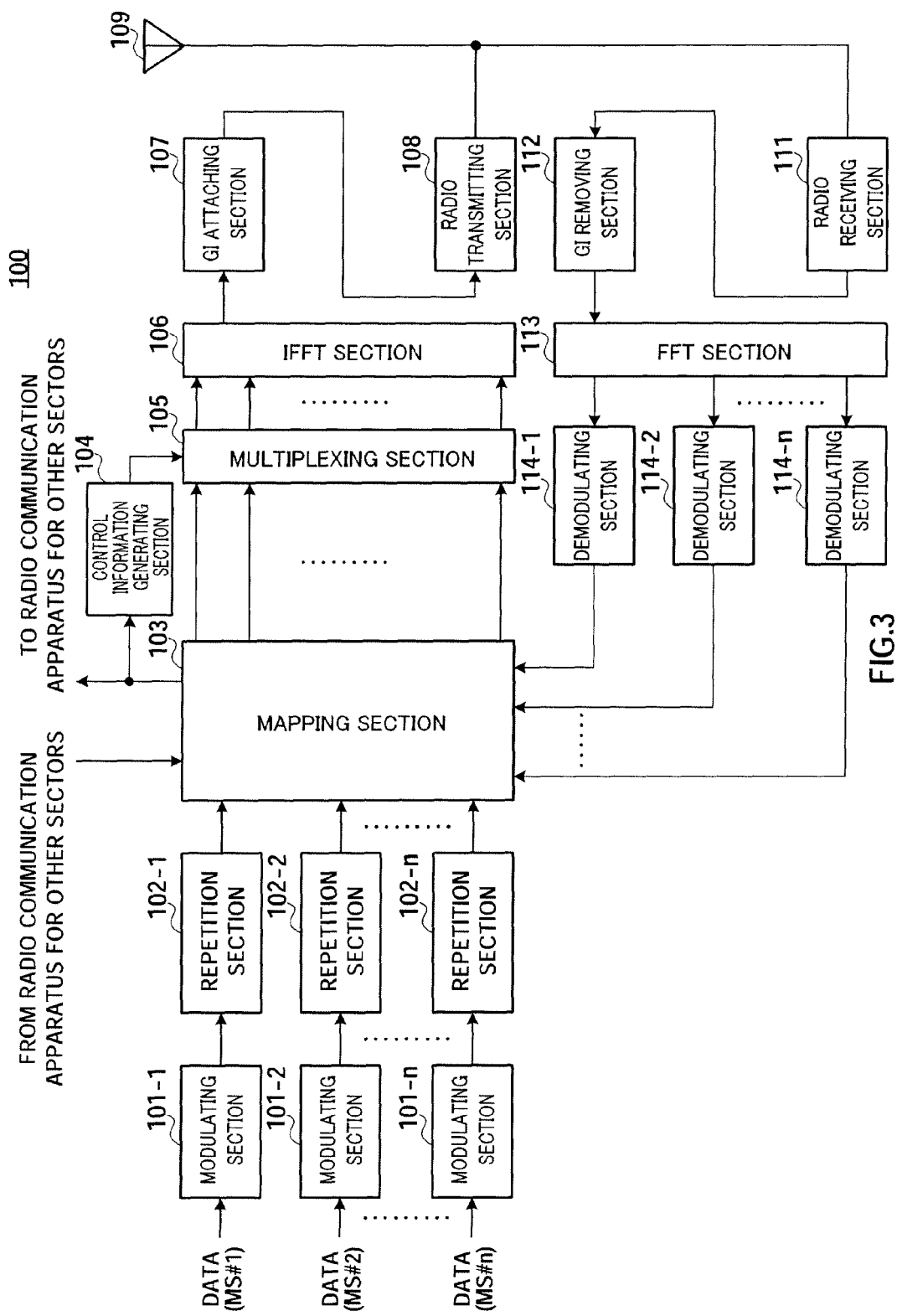
FIG. 3 is a block diagram showing a configuration of a radio communication apparatus, according to Embodiment 1 of the present invention.

The configuration of each radio communication apparatus is shown in FIG. 3. According to the present embodiment, radio communication apparatuses 100-1 to 100-3 shown in FIG. 2 all have the configuration shown in FIG. 3. Moreover, radio communication apparatus 100 shown in FIG. 3 frequency multiplexes data for a plurality of mobile stations MS#1 to MS#n in sectors on a plurality of subcarriers forming an OFDM symbol and transmits the result. In the following description, a case will be described here where radio communication apparatus 100 shown in FIG. 3 is radio communication apparatus 100-1 for sector A.

In radio communication apparatus 100, modulating sections 101-1 to 101-*n* modulate data for a maximum of n mobile stations MS#1 to MS#n respectively to generate data symbols. The generated data symbols are inputted to repetition sections 102-1 to 102-*n*.

Repetition sections 102-1 to 102-*n* repeat data symbols inputted from modulation sections 101-1 to 101-*n* respectively to generate a plurality of same data symbols, and output the symbols to mapping section 103. Incidentally these plurality of the same data symbols form one unit, referred to as the "repetition unit."

Mapping section 103 maps data symbols inputted from repetition sections 102-1 to 102-*n*, to a plurality of subcarriers forming an OFDM symbol, and outputs the result to multiplexing section 105. In addition, in mapping section 103, the mapping information showing which data symbols for which mobile station are mapped to which subcarriers is outputted to control information generating section 104 and radio communication apparatuses for other sectors. Mapping processing in mapping section 103 will be described in detail later.

Control information generating section 104 generates control information including mapping information and outputs the control information to multiplexing section 105.

Multiplexing section 105 multiplexes the control information on the data symbols inputted from mapping section 103, and outputs the results to IFFT (Inverse Fast Fourier Transform) section 106. In this way, control information or data symbols are mapped to subcarriers. Incidentally, control information is multiplexed every TTI (Transmission Time Interval)=0.5 ms, for example. Control information may be performed using frequency multiplexing or time multiplexing.

IFFT section 106 performs IFFT on a plurality of subcarriers to which the control information or data symbols are allocated, to generate an OFDM symbol, which is a multicarrier signal. This OFDM symbol is inputted to GI attaching section 107.

GI attaching section 107 attaches the same signal as the tail part of an OFDM symbol, to the beginning of that OFDM symbol to provide a guard interval ("GI").

Radio transmitting section 108 performs transmission processing including D/A conversion, amplification and up-conversion, on the OFDM symbol with an attachment of a GI, and transmits the OFDM symbol after transmission processing from antenna 109 to each mobile station.

Meanwhile, radio receiving section 111 receives n OFDM symbols via antenna 109, transmitted at the same time from a maximum of n mobile stations MS#1 to MS#n, and performs receiving processing including down-conversion and D/A conversion on these OFDM symbols. The OFDM symbols after receiving processing are inputted to GI removing section 112.

GI removing section 112 removes the GI from the OFDM symbol after receiving processing, and outputs the result to FFT (Fast Fourier Transform) section 113.

FFT section 113 performs FFT on the OFDM symbol after the GI removal to obtain mobile station-specific signals multiplexed in the frequency domain. The mobile station-specific signals after FFT are inputted to demodulating sections 114-1 to 114-n.

Here, the mobile stations transmit signals using unique subcarriers or unique subbands, and the mobile station-specific signals include received quality information for each subband reported from each mobile station. Besides, each mobile station is able to measure received quality per subband, from, for example, the received SNR, received SIR, received SINR, received CINR, received power, interference power, bit error rate, throughput, MCS that achieves a predetermined error rate, and so on. In addition, received quality information may be referred to as "CQI" (Channel Quality Indicator) or "CSI" (Channel State Information), for example.

Moreover, a plurality of subcarriers forming an OFDM symbol are divided into a number of bocks referred to as "subbands", and each subband includes a plurality of subcarriers. For example, if an OFDM symbol formed with subcarriers $f_1$ to $f_{18}$ is divided into three subbands 1 to 3, subbands 1 to 3 each include six subcarriers. Moreover, a "subband" may also be referred to as a "sub-channel," a "subcarrier block," a "chunk" or a "resource block."

Demodulating sections 114-1 to 114-n, which are provided so as to correspond to mobile stations MS#1 to MS#n, perform demodulation processing on the signals after FFT, and output received quality information per subband obtained through the demodulation processing, to mapping section 103.

Based on received quality information per subband reported from each mobile station and mapping information inputted from the radio communication apparatuses for other sectors, mapping section 103 maps the data symbols. After mapping the data symbols by frequency scheduling in a subband unit based on received quality information per subband reported from each mobile station, mapping section 103 maps the data symbols in a subcarrier unit in each subband based on the mapping information inputted from the radio communication apparatus for other sectors.

Specifically, based on received quality information per subband, mapping section 103 performs frequency scheduling to determine which data symbol is mapped to which subcarrier in a subband unit, using scheduling algorithms such as the Max SIR method and the proportional fairness method.

Figure 4:
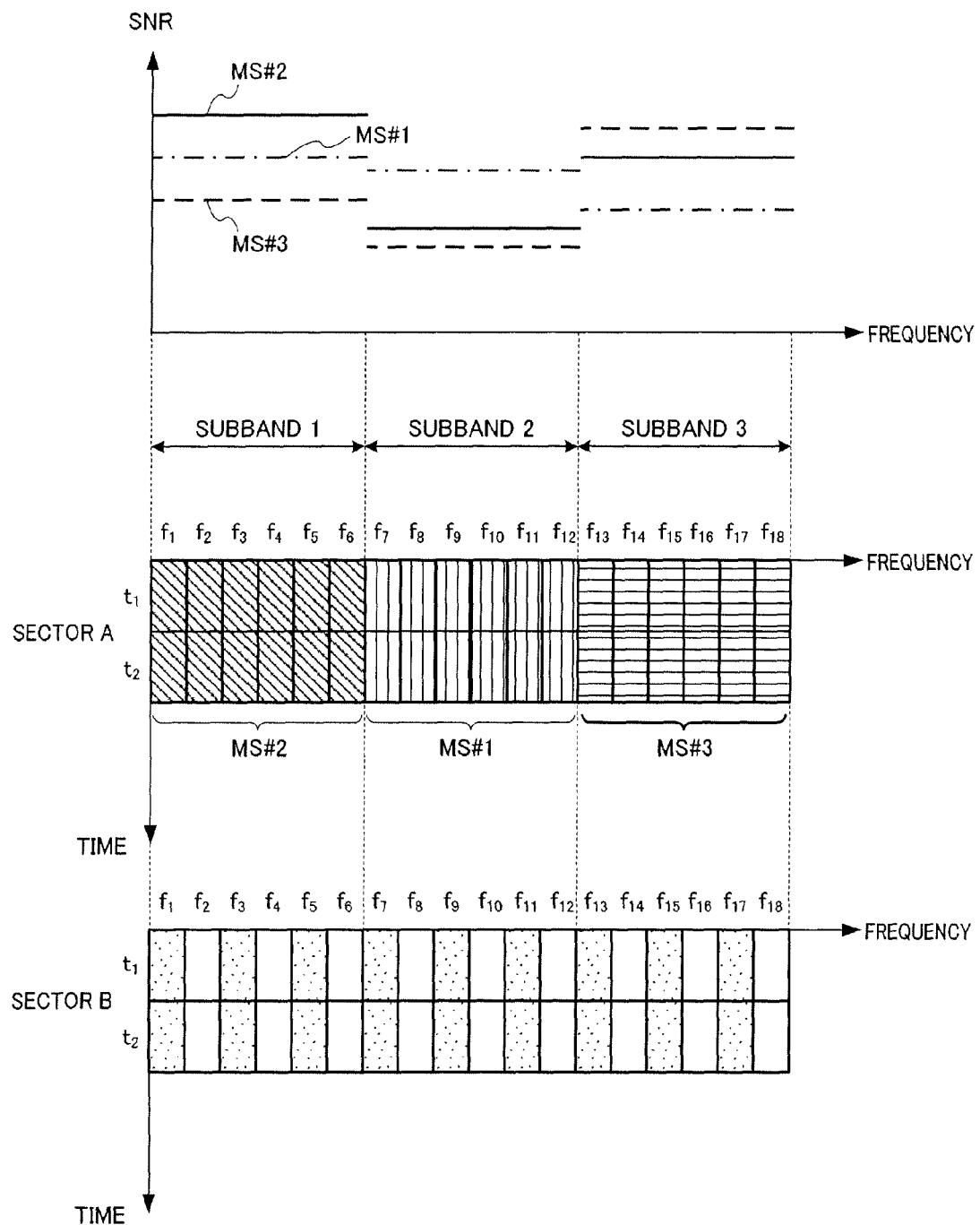
FIG. 4 illustrates mapping processing (pattern 1) according to Embodiment 1 of the present invention.

Next, the mapping processing in mapping section 103 will be described using FIGS. 4 and 5. Here, for ease of description, assume that the OFDM symbol is formed with subcarriers $f_1$ to $f_{18}$, and subcarriers $f_1$ to $f_{18}$ are divided into three subbands 1 to 3, as shown in FIG. 4. Moreover, assume that radio communication apparatus 100-1 for sector A included in base station 10 frequency multiplexes and transmits a total of eighteen data symbols, six data symbols for each of three mobile stations MS#1 to MS#3 located in sector A at the same time. Moreover, assume that each mobile station measures received quality of each subband using received SNR.

Now, in subbands 1 to 3, the SNR for mobile stations MS#1 to MS#3 becomes as shown at the top of FIG. 4, the SNR for mobile station MS#2 is the highest in subband 1, the SNR for mobile station MS#1 is the highest in subband 2, and the SNR for mobile station MS#3 is the highest in subband 3. That is, as shown in the middle of FIG. 4, by frequency scheduling, mapping section 103 for sector A maps the data symbols for mobile station MS#2 to subband 1 (subcarriers $f_1$ to $f_6$), maps the data symbols for mobile station MS#1 to subband 2 (subcarriers $f_7$ to $f_{12}$) and maps the data symbols for mobile station MS#3 to subband 3 (subcarrier $f_{13}$ to $f_{16}$).

In this way, mapping section 103 first gathers data symbols on a per mobile station basis and maps these symbols to a plurality of subbands in the frequency domain. In other words, mapping section 103 maps a plurality of data symbols for one of a plurality of mobile stations, to one of a plurality of subbands in a localized manner. In this way, frequency scheduling transmission is performed for each data symbol. Moreover, mapping section 103 performs this frequency scheduling every TTI=0.5 ms, for example.

Then, at that time, the symbol mapping shown by mapping information inputted from radio communication apparatus 100-2 for sector B to radio communication apparatus 100-1 for sector A, that is, the symbol mapping in sector B, is assumed to be shown in the bottom of FIG. 4. The symbol mapping in sector B shown in the bottom of FIG. 4 designates that data symbols are mapped to subcarriers $f_1$, $f_3$, $f_5$, $f_7$, $f_9$, $f_{11}$, $f_{13}$, $f_{15}$ and $f_{17}$ in time $t_1$ and $t_2$, data symbols are not mapped to subcarriers $f_2$, $f_4$, $f_6$, $f_8$, $f_{10}$, $f_{12}$, $f_{14}$, $f_{16}$ and $f_{18}$. In this way, in sector B, subcarriers where data symbols are mapped, are provided in a distributed manner in each subband and frequency diversity transmission is performed.

Figure 5:
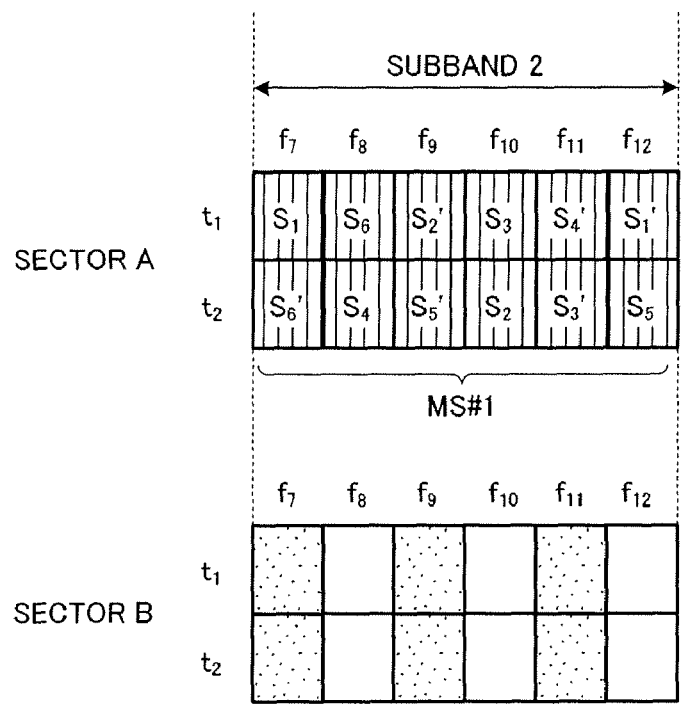
FIG. 5 illustrates mapping processing (subband 2) according to Embodiment 1 of the present invention.

Here, focusing on mobile station MS#1 (subband 2), based on the mapping information from radio communication apparatus 100-2 for sector B, mapping section 103 for sector A maps the data symbols for mobile station MS#1 as shown in the top of FIG. 5. In the top of FIG. 5, data symbols $S_1'$, $S_2'$, $S_3'$, $S_4'$, $S_5'$ and $S_6'$ are the same data symbols as $S_1$, $S_2$, $S_3$, $S_4$, $S_5$ and $S_6$ generated by repetition of data symbols $S_1$, $S_2$, $S_3$, $S_4$, $S_5$ and $S_6$ respectively at repetition factor ("RF") of two. That is, mapping section 103 maps at least one of a plurality of the same symbols repeated by repetition to subcarriers that are different from subcarriers where symbols are mapped in neighboring sectors.

For example, in the example shown in FIG. 5, mapping section 103 for sector A maps data symbols $S_6$, $S_4$, $S_3$, $S_2$, $S_1'$ and $S_5$ to subcarriers $f_8$, $f_{10}$ and $f_{12}$, where data symbols are not mapped in sector B, and maps data symbols $S_1$, $S_6'$, $S_2'$, $S_5'$, $S_4'$ and $S_3'$ to subcarriers $f_7$, $f_9$ and $f_{11}$, where data symbols are mapped in sector B. That is, in sector A, mapping section 103 maps one of the same data symbols to subcarriers not subjected to interference from sector B and maps the other one of the same data symbols to subcarriers subjected to interference from sector B.

In this way, upon mapping a plurality of the same symbols to one of a plurality of subbands in a localized manner, mapping section 103 for sector A maps data symbols to subcarriers where data symbols are mapped in sector B and to subcarriers where data symbols are not mapped in sector B.

This mapping makes it possible to prevent a plurality of the same symbols generated by repetition from being all interfered from neighboring sectors. Consequently, according to the present embodiment, when repetition technique is used in multicarrier communications in mobile communications, decrease of diversity gain can be minimized.

Figure 6:
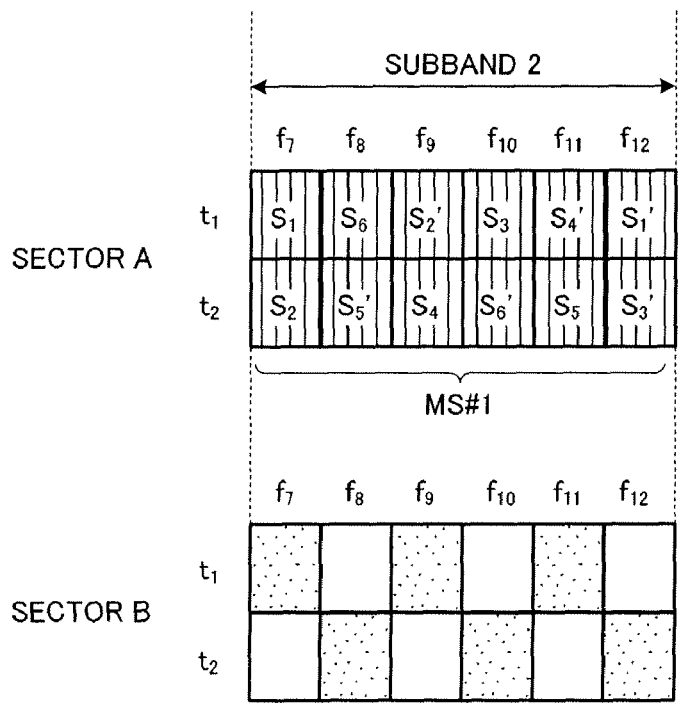
FIG. 6 illustrates mapping processing (pattern 2) according to Embodiment 1 of the present invention.

Moreover, although a case has been described above where mapping in sector B is the same in time $t_1$ and $t_2$ (see FIGS. 4 and 5), as shown in FIG. 6, the present invention can be implemented as above where mapping in sector B changes over time, that is, on a per OFDM symbol basis. In the example of FIG. 6, at time $t_1$, mapping section 103 for sector A maps data symbols $S_6$, $S_3$ and $S_1'$ to subcarriers $f_8$, $f_{10}$ and $f_{12}$ where data symbols are not mapped in sector B and data symbols $S_1$, $S_2'$ and $S_4'$ to subcarriers $f_7$, $f_9$ and $f_{11}$ where data symbols are mapped in sector B. At time $t_2$, mapping section 103 maps data symbols $S_2$, $S_4$ and $S_5$ to subcarriers $f_7$, $f_9$ and $f_{11}$ where data symbols are not mapped in sector B and data symbols $S_5'$, $S_6'$ and $S_3'$ to subcarriers $f_8$, $f_{10}$ and $f_{12}$ where data symbols are mapped in sector B.

Figure 7:
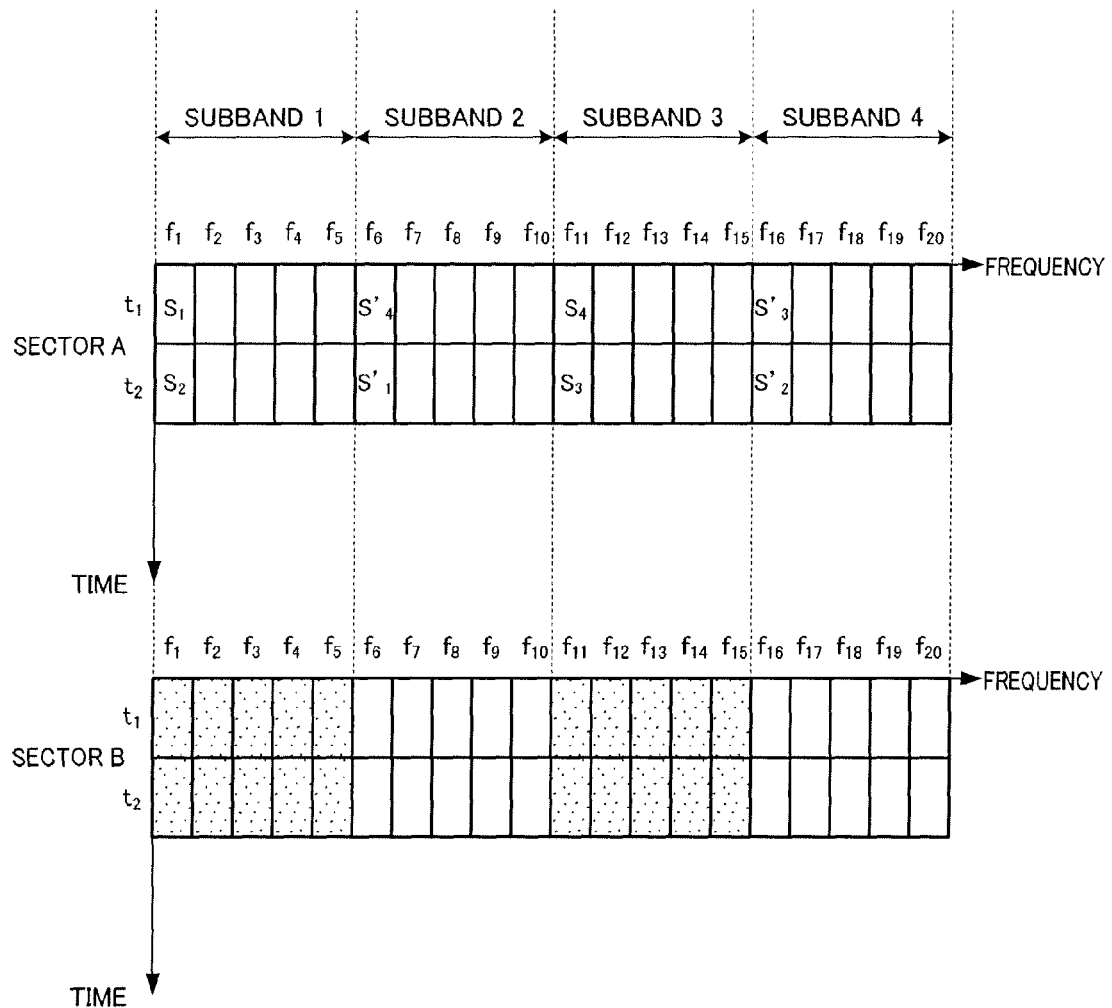
FIG. 7 illustrates mapping processing (pattern 3) according to Embodiment 1 of the present invention.

Moreover, although a case has been described above where subcarriers to which data symbols are mapped, are in a distributed manner in sector B, the present invention can be implemented as above the case where data symbols are mapped in a localized manner on a per subband basis as shown in FIG. 7. In this case, mapping section 103 for sector A maps a plurality of the same data symbols to a plurality of subcarriers in a distributed manner mapping the data symbols to both subcarriers where data symbols are mapped and subcarriers where data symbols are not mapped in sector B. In the example of FIG. 7, data symbols are mapped in subbands 1 and 3 in sector B in a localized manner, so that mapping section 103 for sector A maps data symbols $S_4'$, $S_1'$, $S_3'$ and $S_2'$ to subbands 2 and 4 where data symbols are not mapped in sector B and data symbols $S_1$, $S_2$, $S_4$ and $S_3$ to subbands 1 and 3 where data symbols are mapped in sector B.

Figure 8:
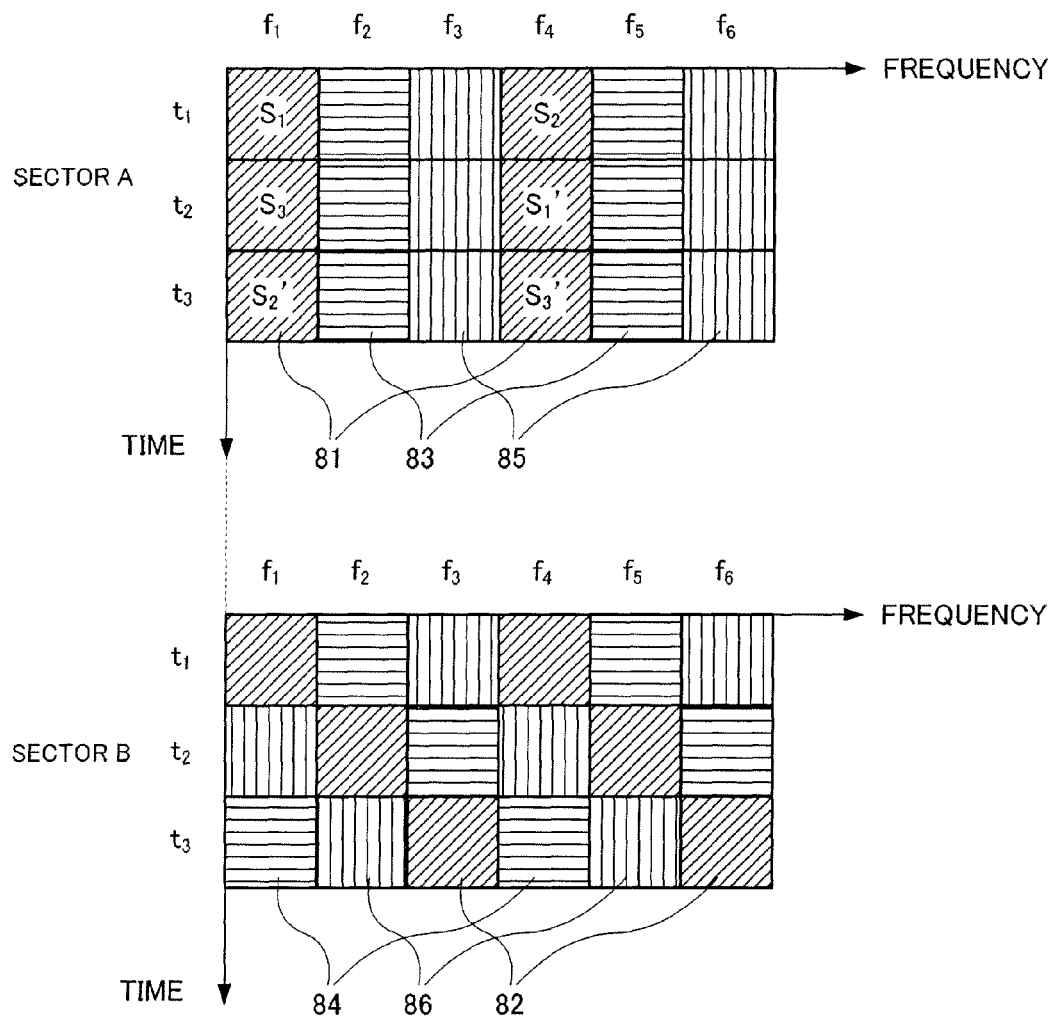
FIG. 8 illustrates mapping processing (pattern 4) according to Embodiment 1 of the present invention.

Moreover, even when subcarriers where data symbols are mapped are distributed in both sector A and sector B, the present invention can be implemented as above. For example, as shown in FIG. 8, when the mapping pattern in sector B is one of 82, 84 and 86, one of mapping patterns 81, 83 and 85 is used in sector A, so that a plurality of the same data symbols are mapped to a plurality of subcarriers in a distributed manner. For example, in FIG. 8, mapping section 103 for sector A maps data symbols $S_1$, $S_3$ and $S_2'$ to subcarrier $f_1$ and data symbols $S_2$, $S_1'$ and $S_3'$ to subcarrier $f_4$, using mapping pattern 81. By this mapping in sector A, even when the mapping pattern in sector B is one of 82, 84 and 86, in sector A, a plurality of the same data symbols can be mapped to both subcarriers where data symbols are not mapped and subcarriers where data symbols are mapped in sector B.

Figure 9:
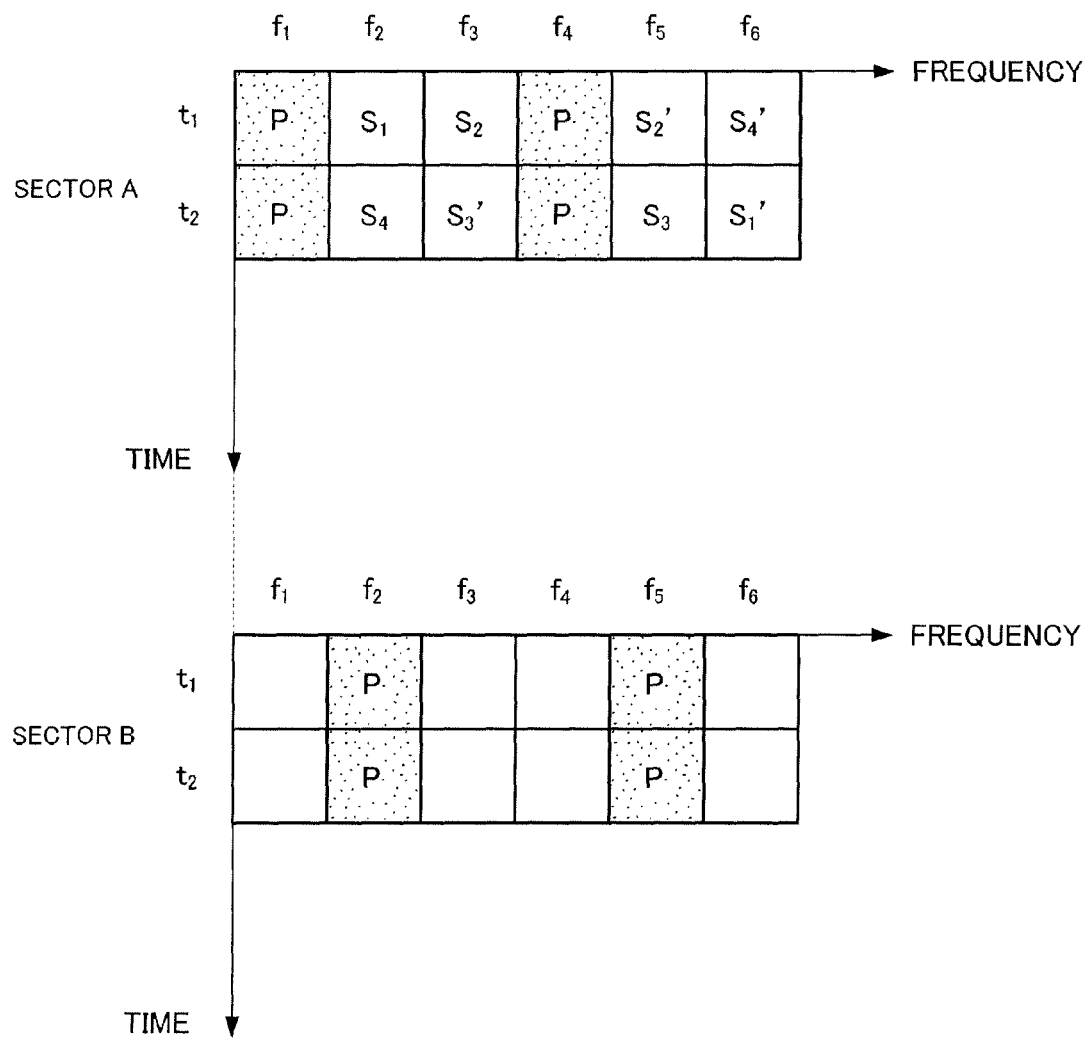
FIG. 9 illustrates mapping processing (pattern 5) according to Embodiment 1 of the present invention.

Furthermore, the present invention is applicable to interference from pilot channels, control channels, broadcast channels and synchronization channels for neighboring sectors, in addition to interference from data symbols for neighboring sectors. That is, the present invention is applicable as above when repetition is performed with symbols including pilot channels, control channels, broadcast channels and synchronization channels. For example, as shown in FIG. 9, when pilot symbol P is mapped to subcarriers $f_2$ and $f_5$ in sector B, mapping section 103 for sector A maps data symbols $S_2$, $S_3'$, $S_4'$ and $S_1'$ to subcarriers $f_3$ and $f_6$ where pilot symbol P is not mapped and data symbols $S_1$, $S_4$, $S_2'$ and $S_3$ to subcarriers $f_2$ and $f_5$ where pilot symbol P is mapped in sector B. This mapping in sector A make it possible to map a plurality of the same data symbols to both subcarriers where a pilot symbol is not mapped and subcarriers where a pilot symbol is mapped in sector B. The same applies to the following embodiments.

Furthermore, preferable control channels to apply the present invention include L1/L2 Control Channel, SCCH (Shared Control Channel), PCH (Paging Channel) and ACK/NACK channel, and preferable channels for synchronization channel to apply the present invention include SCH (Synchronization Channel) channel and a channel for cell search. In addition, a signal of a pilot channel may refer to "reference signal."

Furthermore, control information generated by control information generating section 104 may include in mapping information in neighboring sectors. By this means, at a mobile station, a plurality of the same data symbols that are received can be divided data symbols subjected to interference from neighboring sectors into data symbols not subjected to interference from neighboring sectors, so that, upon maximum ratio combining of these data symbols, the data symbols subjected to interference are multiplied by smaller weight and symbols not subjected to interference are multiplied by greater weight, thereby improving received quality of data symbols after combining.

Embodiment 2

According to the present embodiment, a case will be described here where neighboring sectors are able to employ a plurality of mapping patterns specified in advance.

Figure 10:
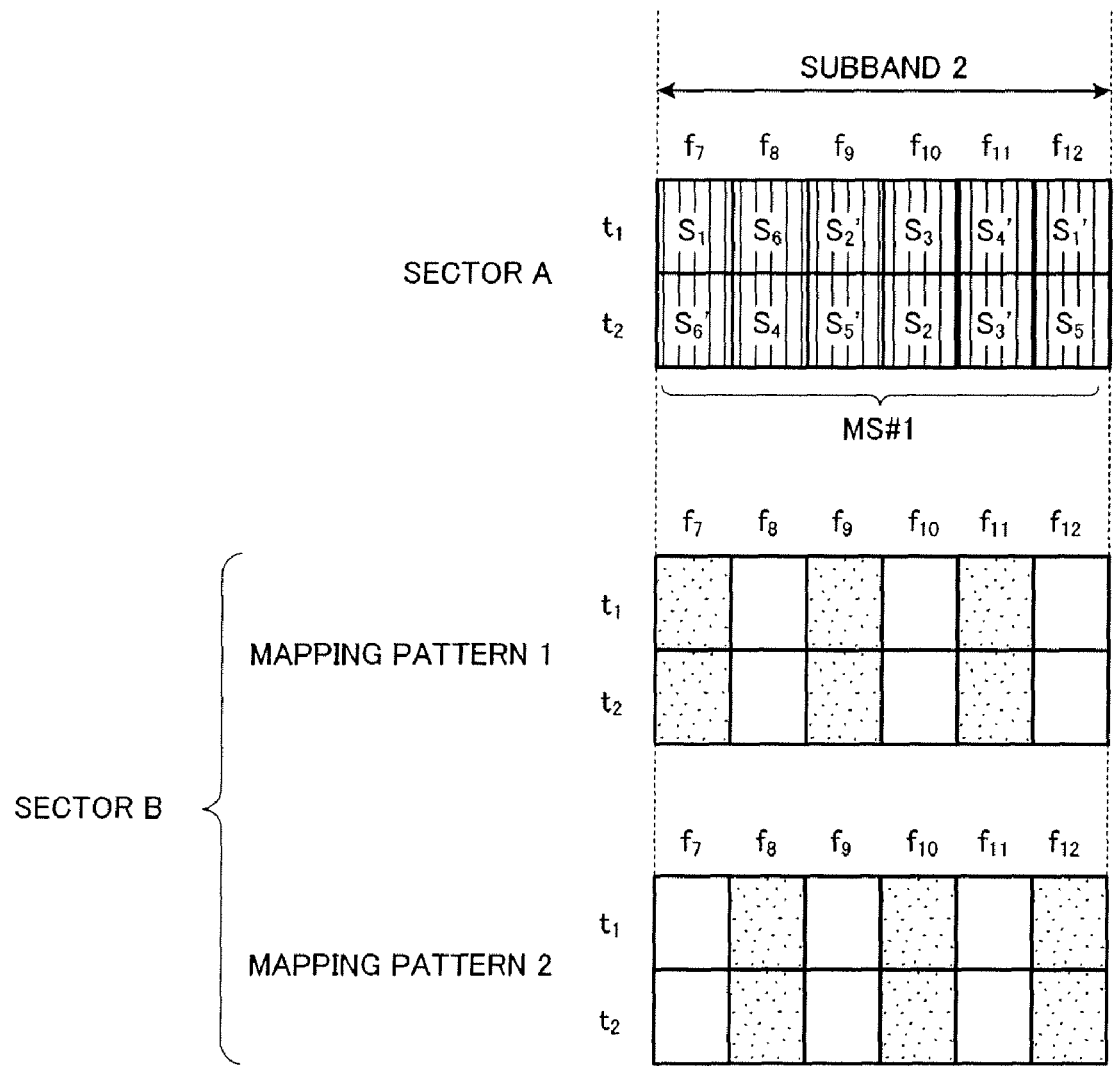
FIG. 10 illustrates mapping processing according to Embodiment 2 of the present invention.

As shown in FIG. 10, for example, when the mapping pattern in sector B is decided in advance to employ one of mapping pattern 1 and mapping pattern 2, based on this plurality of mapping patterns, mapping section 103 for sector A maps data symbols for mobile station #1 as shown in the top of FIG. 10. In the example shown in FIG. 10, mapping section 103 for sector A maps data symbols $S_1$, $S_6'$, $S_2'$, $S_5'$, $S_4'$ and $S_3'$ based on pattern 1 in sector B and data symbols $S_6$, $S_4$, $S_3$, $S_2$, $S_1'$ and $S_5$ based on pattern in sector B. That is, mapping section 103 maps a plurality of the same symbols to different subcarriers that belong to the different mapping patterns. For example, mapping section 103 maps data symbol $S_1$ to subcarrier $f_7$ belonging to mapping pattern 1 in sector B, and maps data symbol $S_1'$ to subcarrier $f_{12}$ belonging to mapping pattern 2 in sector B.

By this mapping of mapping section 103 for sector A, unless both mapping patterns are used in sector B at the same time, similar to Embodiment 1, in sector A, at least one of a plurality of the same symbols repeated by repetition can be mapped to subcarriers different from subcarriers where symbols are mapped in neighboring sectors.

Consequently, according to the present embodiment, similar to Embodiment 1, when repetition technique is used in multicarrier communications in mobile communications, it is possible to prevent a plurality of the same symbols generated by repetition from being all interfered from neighboring sectors, so that decrease of diversity gain can be minimized.

Moreover, when a plurality of mapping patterns that can be used in neighboring sectors change on a regular cycle or change depending on communication quality and so on, whenever the mapping patterns change, radio transmission apparatuses 100-1 to 100-3 may exchange information as to which mapping pattern is used in each sector (i.e., mapping pattern information).

Embodiment 3

In the present embodiment, a case will be described here where some of a plurality of mapping patterns adopted by neighboring sectors, are used at the same time.

Figure 11:
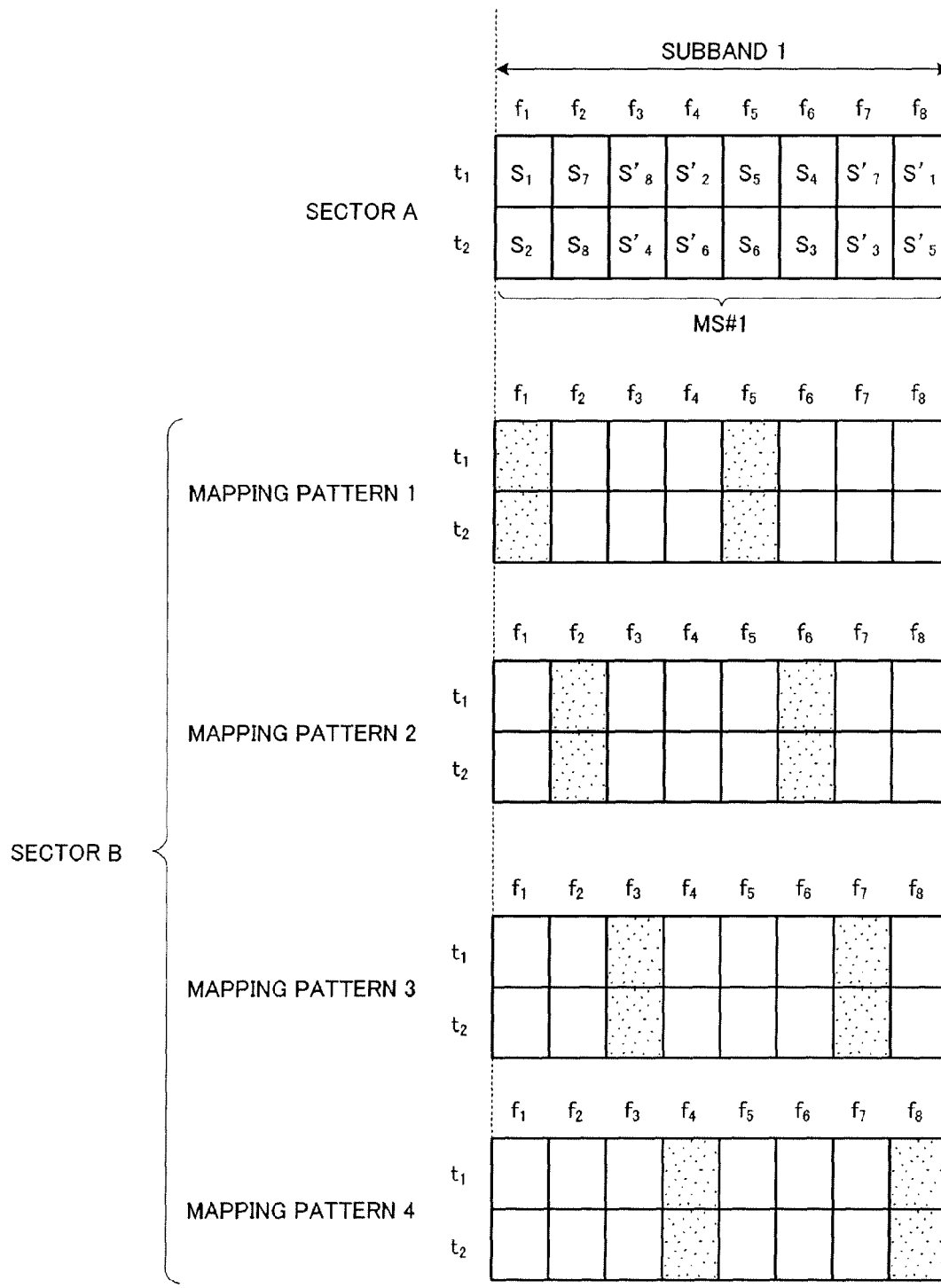
FIG. 11 illustrates mapping processing (pattern 1) according to Embodiment 3 of the present invention.

Now, for example, as shown in FIG. 11, assume that four mapping patterns 1 to 4 can be used in sector B, and some of these mapping patterns are used at the same time in accordance with the amount of data. In this case, priorities are given in mapping patterns 1 to 4 in the table shown in FIG. 12. That is, in sector B, mapping patterns are used in order of 3, 2 and 4 in addition to mapping pattern 1, in accordance with increase of the amount of data.

In this way, when priorities are set for a plurality of mapping patterns 1 to 4 in sector B, mapping section 103 for sector A maps a plurality of the same symbols to different subcarriers belonging to different mapping patterns according to the priorities. For example, as shown in the top of FIG. 11, mapping section 103 maps a plurality of the same symbols in the combination of mapping pattern 1 of priority 1 and mapping pattern 4 of priority 4 or in the combination of mapping pattern 3 of priority 2 and mapping pattern 2 of priority 3. To be more specific, for example, upon mapping data symbol $S_1$ to subcarrier $f_1$ belonging to mapping pattern 1, mapping section 103 maps data symbol $S_1'$ to subcarrier $f_8$ belonging to mapping pattern 4. In addition, upon mapping data symbol $S_4'$ to subcarrier $f_3$ belonging to mapping pattern 3, mapping section 103 maps data symbol $S_4$ to subcarrier $f_6$ belonging to mapping pattern 2.

When a plurality of mapping patterns are used at the same time in neighboring sectors, this mapping makes it less likely to map a plurality of the same symbols generated by repetition to the same subcarriers used in neighboring sectors. Consequently, according to the present embodiment, even when a plurality of mapping patterns can be used at the same time in neighboring sectors, it is less likely that all a plurality of the same symbols generated by repetition are subjected to interference from neighboring sectors.

Figure 13:
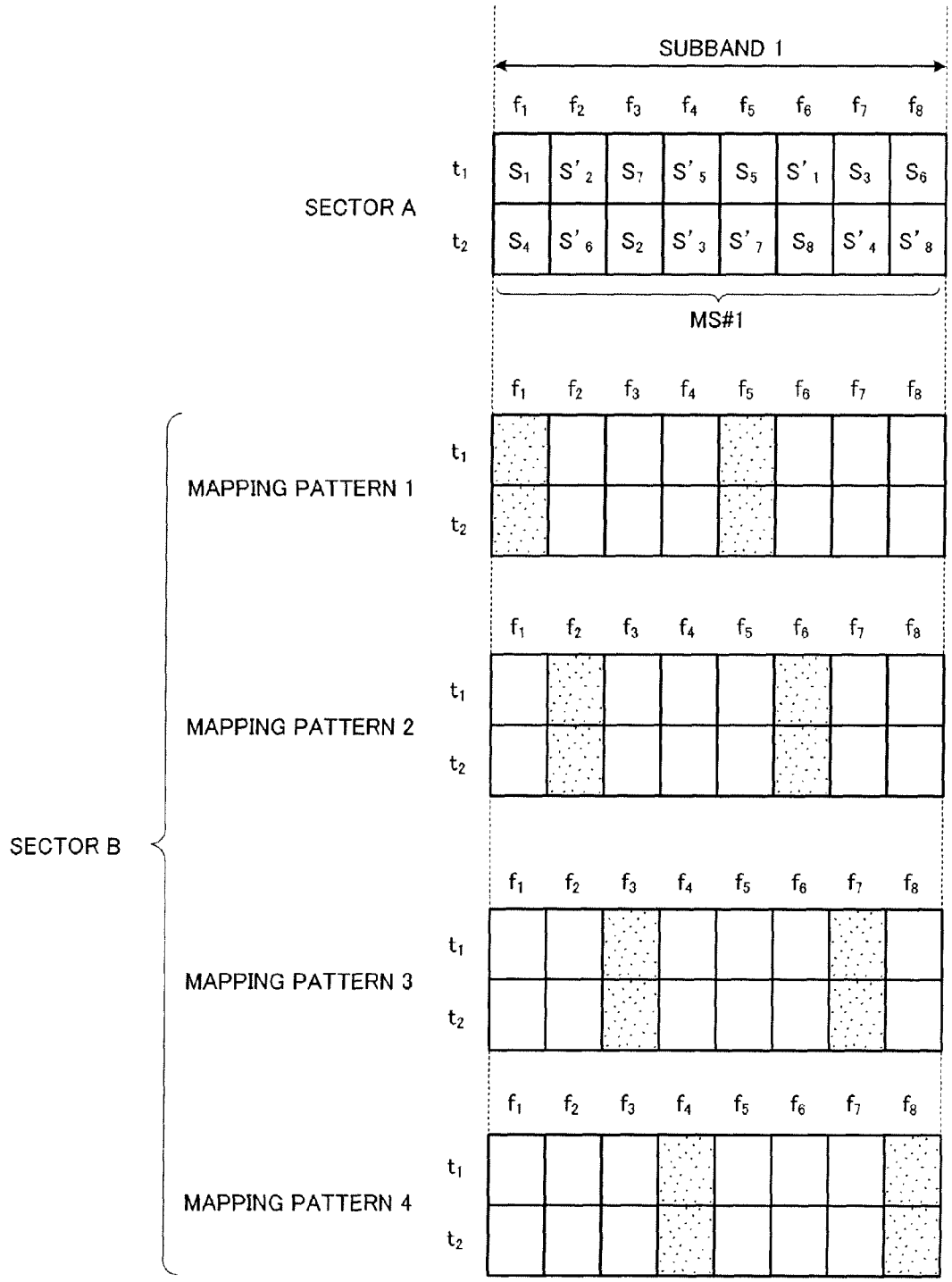
FIG. 13 illustrates mapping processing (pattern 2) according to Embodiment 3 of the present invention.

Besides, when priorities for a plurality of mapping patterns in sector B is not determined, mapping section 103 for sector A, as shown in FIG. 13, maps a plurality of the same symbols by equally using the mapping patterns, in the combination of mapping pattern 1 and mapping pattern 2, the combination of mapping pattern 2 and mapping pattern 3, the combination of mapping pattern 3 and mapping pattern 4, the combination of mapping pattern 1 and mapping pattern 3, the combination of mapping pattern 1 and mapping pattern 4, and the combination of mapping pattern 2 and mapping pattern 4.

Embodiments of the present invention have been described above.

Figure 14:
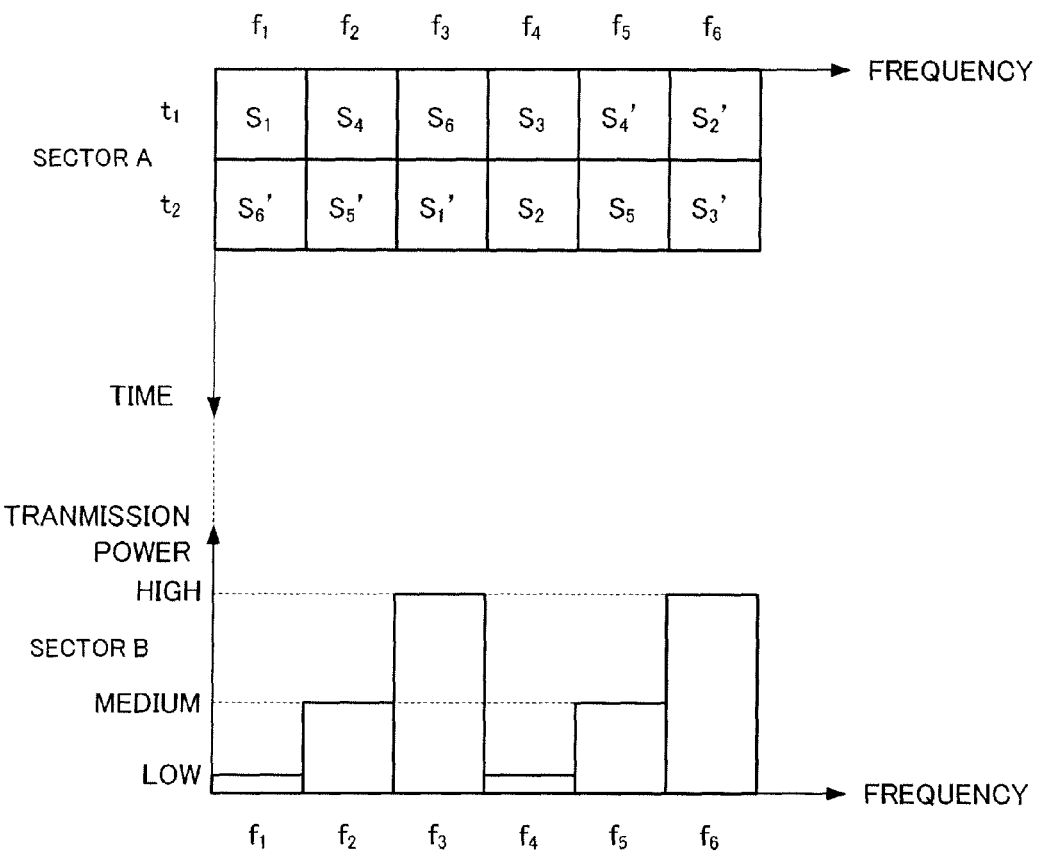
FIG. 14 illustrates other mapping processing.

Moreover, in the above description, subcarriers where data symbols are not mapped in sector B, can be regarded as subcarriers with zero transmission power. Furthermore, in sector B, data symbols that interfere with sector A are regarded as data symbols with relatively high transmission power. That is, the amount of interference with sector A from sector B depends on transmission power in sector B. Then, the data symbol mapping in sector A may be performed in accordance with transmission power per subcarrier. For example, as shown in FIG. 14, when transmission power per subcarrier in sector B is distinguished as three levels of low, medium and high, mapping section 103 for sector A maps data symbols $S_1$, $S_6'$, $S_3$ and $S_2$ to subcarriers $f_1$ and $f_4$ of low transmission power in sector B, maps data symbols $S_4$, $S_5'$, $S_4'$ and $S_5$ to subcarriers $f_2$ and $f_5$ of medium transmission power in sector B and maps data symbols $S_6$, $S_1'$, $S_2'$ and $S_3'$ to subcarriers $f_3$ and $f_6$ of high transmission power in sector B. By this mapping in sector A, a plurality of the same data symbols are mapped to both subcarriers of low transmission power and subcarriers of high transmission power, so that, similar to the above, it is possible to prevent a plurality of the same symbols generated by repetition from being all interfered from neighboring sectors.

Moreover, whether the present invention is applied or not may be determined in accordance with resource utilization in neighboring sectors. That is, unless resource utilization in neighboring sectors is 0% or nearly 100%, the present invention may be applied and when resource utilization in neighboring sectors is 0% or nearly 100%, a plurality of the same symbols may be mapped so as to obtain a maximum frequency diversity effect.

Figure 15:
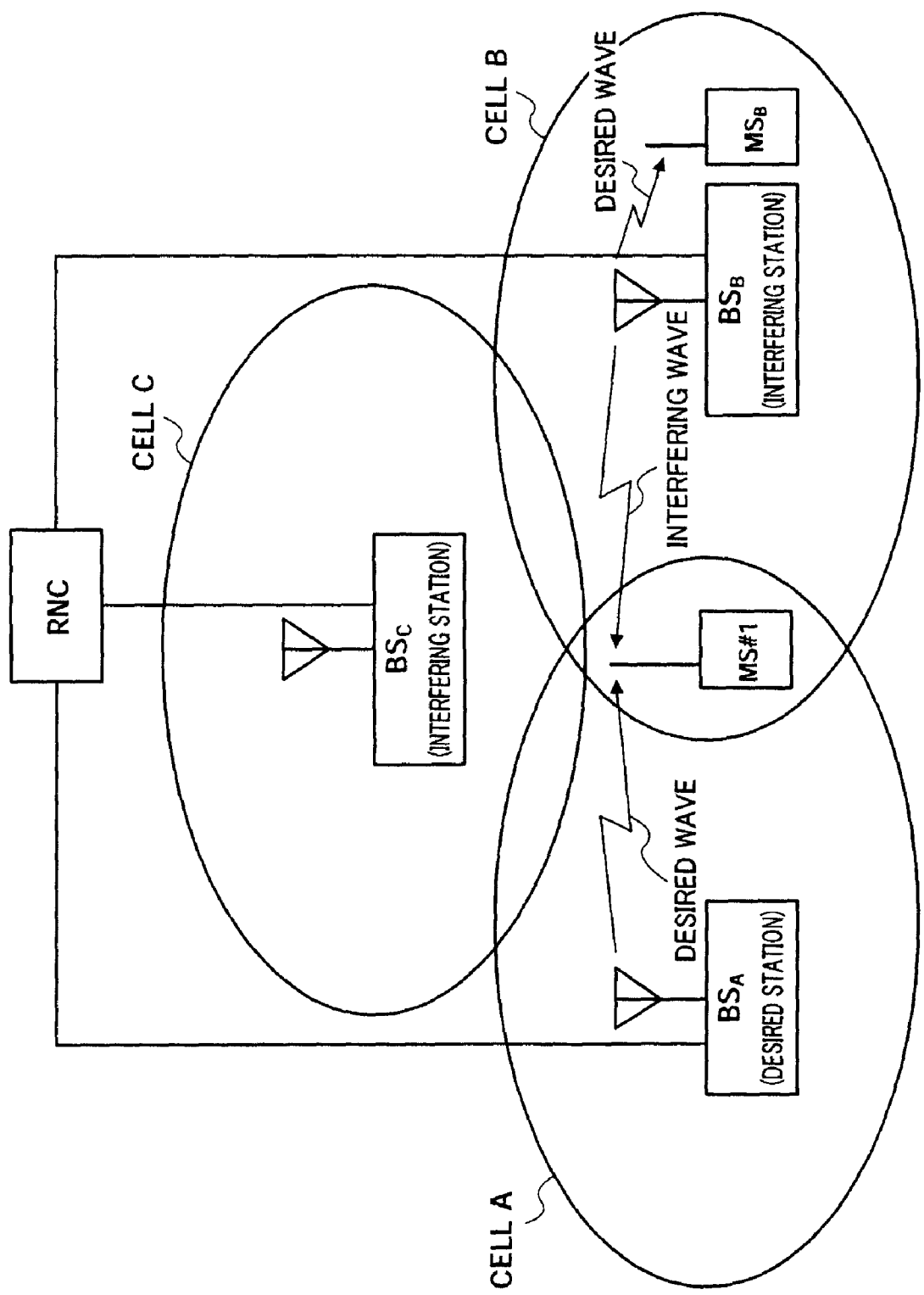
FIG. 15 is a configuration diagram showing a mobile communication system, similarly applicable to the present invention.

Furthermore, although cases have been described above where the present invention is implemented between neighboring sectors, the present invention may also be implemented between neighboring cells. For example, in the mobile communication system shown in FIG. 15, the present invention can be implemented similarly in the mobile communication system shown in FIG. 1. That is, in the above description, by regarding sector A as cell A, sector B as cell B, and sector C as cell C, the present invention may also be implemented. In this case, base stations $BS_A$, $BS_B$ and $BS_C$ each have the configuration shown in FIG. 3. Moreover, mapping information and mapping pattern information between base stations in the mobile communication system shown in FIG. 15 are exchanged via radio network control station apparatus (RNC).

Moreover, although cases have been described above with the present embodiments where the signals received at a base station (i.e., signals transmitted by a mobile station on uplink) are transmitted using the OFDM scheme, signals may be transmitted using other transmission schemes than the OFDM scheme, including single carrier schemes, CDMA schemes, and DFT-SOFDM (Discrete Fourier Transform-Spread OFDM) schemes.

Moreover, a mobile station may be referred to as "UE," base station may be referred to as "Node-B," and a subcarrier may be referred to as "tone."

Moreover, a channel for frequency scheduling transmission may be referred to as a "localized channel" or a "localized resource block" and a channel for frequency diversity transmission may be referred to as a "distributed channel" or a "distributed resource block." Moreover, the localized channel is usually mapped in subband units or in units of a plurality of consecutive subcarriers. Moreover, the distributed channel is usually formed with a plurality of subcarriers at regular interval over the entire bandwidth of an OFDM symbol or is defined by an FH (Frequency Hopping) patterns. Furthermore, the distributed channel may be the object of frequency interleaving.

Moreover, although the cases have been described above with the embodiments where mapping information is exchanged between sectors, when data symbol mappings used in sectors are determined in advance, the exchange of mapping information is unnecessary.

Moreover, although cases have been described above with the embodiments where there is one interfering neighboring sector, the present invention may also be implemented even when there are a plurality of interfering neighboring sectors.

Moreover, although examples have been described above with the embodiments where RF equals two, the present invention may also be implemented where RF equals to three or more.

Moreover, although cases have been described above with the embodiments where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-228456, filed on Aug. 5, 2005, the entire content of which is expressly incorporated by reference herein.

INDUSTRIAL APPLICABILITY

The present invention is suitable, for example, for mobile communication systems.

The invention claimed is:

1. A radio communication base station apparatus configured for transmitting a multicarrier signal formed with a plurality of subcarriers, the apparatus comprising:
   a repetition section that repeats a symbol to generate a plurality of same symbols; and
   a mapping section that maps the plurality of same symbols to the plurality of subcarriers,
   wherein the mapping section maps at least one symbol of the plurality of same symbols to a first subcarrier to which a symbol is to be mapped in a different sector or a different cell, and maps at least one other symbol of the plurality of same symbols to a second subcarrier to which no symbol is to be mapped in the different sector or the different cell.

2. The radio communication base station apparatus according to claim 1, wherein:
   the plurality of subcarriers are grouped into a plurality of subbands; and
   the mapping section further maps the plurality of the same symbols to at least one subband of the plurality of subbands in a localized manner.

3. The radio communication base station apparatus according to claim 2, wherein:
   symbols are mapped in a distributed manner in one subband of the plurality of subbands in the different sector or the different cell; and
   the mapping section, upon mapping the plurality of same symbols to the at least one subband of the plurality of subbands in the localized manner, maps the at least one symbol of the plurality of same symbols to the first subcarrier to which the symbol is mapped in the different sector or the different cell and maps the at least one other symbol of the plurality of same symbols to the second subcarrier to which no symbols are mapped in the different sector or the different cell.

4. The radio communication base station apparatus according to claim 1, wherein the second subcarrier to which no symbols are to be mapped in the different sector or the different cell has a transmission power that is zero or smaller than a transmission power in the first subcarrier to which the symbol is to be mapped in the different sector or the different cell.

5. A radio communication base station apparatus configured for transmitting a multicarrier signal formed with a plurality of subcarriers, the apparatus comprising:
   a repetition section that repeats a symbol to generate a plurality of same symbols; and
   a mapping section that maps the plurality of same symbols to the plurality of subcarriers,
   wherein, based on a plurality of mapping patterns in a different sector or a different cell, the mapping section maps at least one symbol of the plurality of same symbols to a first subcarrier belonging to one mapping pattern of the plurality of mapping patterns and maps at least one other symbol of the plurality of same symbols to a second subcarrier belonging to at least one other mapping pattern of the plurality of mapping patterns.

6. The radio communication base station apparatus according to claim 5, wherein, according to priorities given in the plurality of mapping patterns, the mapping section maps at least one symbol of the plurality of same symbols to a third subcarrier belonging to a first mapping pattern of the plurality of mapping patterns and maps at least one other symbol of the plurality of same symbols to a fourth subcarrier belonging to a second mapping pattern of the plurality of mapping patterns, the second mapping pattern of the plurality of mapping patterns being different from the first mapping pattern of the plurality of mapping patterns with respect to the priorities.

7. A radio communication method in a radio communication base station apparatus configured for transmitting a multicarrier signal formed with a plurality of subcarriers, the method comprising:
   repeating a symbol to generate a plurality of same symbols; and
   mapping the plurality of same symbols to the plurality of subcarriers,
   wherein at least one symbol of the plurality of same symbols is mapped to a first subcarrier to which a symbol is to be mapped in a different sector or a different cell, and at least one other symbol of the plurality of same symbols is mapped to a second subcarrier to which no symbols are to be mapped in the different sector or the different cell.

* * * * *